Nov. 24, 1959     G. N. NADLER ET AL     2,914,730
APPARATUS FOR DETERMINING VELOCITY OF HUMAN BODY MEMBERS
Filed April 23, 1956
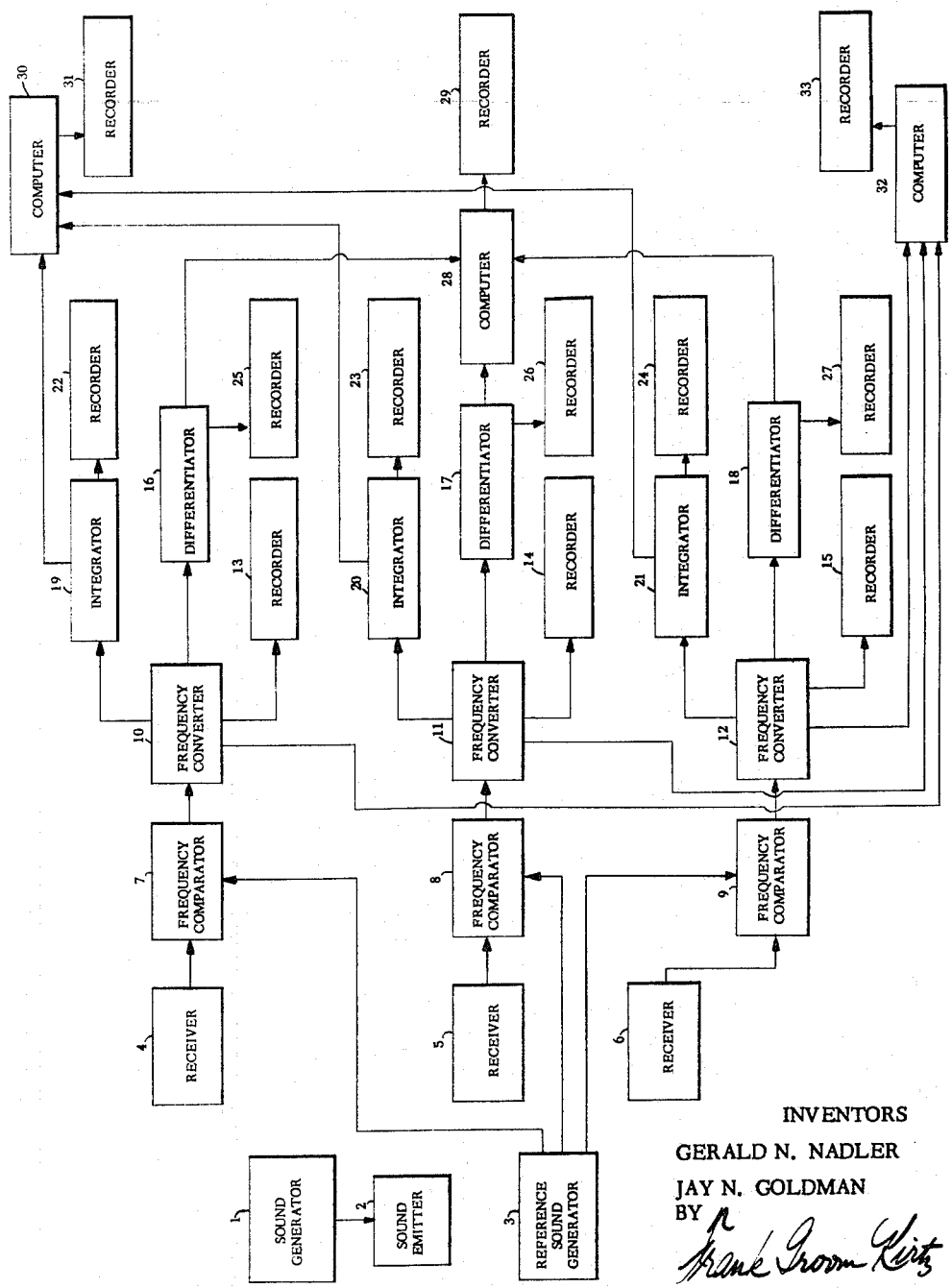
INVENTORS
GERALD N. NADLER
JAY N. GOLDMAN
BY

United States Patent Office 2,914,730
Patented Nov. 24, 1959

2,914,730
APPARATUS FOR DETERMINING VELOCITY OF HUMAN BODY MEMBERS

Gerald N. Nadler, Olivette, and Jay N. Goldman, Richmond Heights, Mo.

Application April 23, 1956, Serial No. 579,993

3 Claims. (Cl. 324—70)

The present invention relates to devices and methods for making measurements and investigations by means of ultrasonic waves. A particular object of the invention is to provide a method of and apparatus for determining the displacement, velocity and acceleration of human body members.

In measuring operator performance or work rates for motion and time studies it has heretofore been difficult to establish the displacement, velocity and acceleration of body members with a high degree of accuracy because of inherent factors in the equipment employed. Moving pictures have been the principal tool utilized in the past. However it has thus been necessary to analyze individual photographic frames by projecting the pictures. Essentially the result has been to obtain a two-dimensional analysis rather than the desirable three-dimensional analysis. In addition the use of moving pictures is subject to the problem of parallax which lowers accuracy.

Our invention consists in attaching a source emitting ultrasonic waves of a constant frequency to the body member, usually the hand. The source is extremely small and does not interfere with, or in any way limit the activity of the body member. Our system measures the components of the displacement, velocity and acceleration of the emitting source, which is the same as that of the body member. For these purposes we juxtapose three microphones at such observation stations that their directional axes for reception of the ultrasonic wavetrain lie in three mutually perpendicular planes.

Movement of the emitting source of the ultrasonic waves produces changes in the frequencies received by the three directionally-disposed microphones. This condition is known as the Doppler effect. Electronic recorders receive the constant base frequency emitted plus or minus the Doppler difference due to motion toward or away from the microphones.

It is known that if $v$ is the speed of a source along a line toward or away from a single microphone, the frequency variation $\Delta F$ due to the Doppler effect is given by the following relation:

$$\Delta Fv \pm F_0 v = \Delta FV$$

where $F_0$ is the frequency of the emitted ultrasonic wave and $V$ is the velocity of sound in air. Thus plus sign is applied to describe the condition in which the motion of the emitter is toward the microphone, in which case more cycles of the wave train are received per second. The minus sign is applied to describe the condition in which the motion of the emitter is away from the receiving microphone, in which case fewer cycles of the wave train are received per second.

By factoring and transposing we arrive at:

$$\Delta F(V-v) = \pm F_0 V$$

Dividing by $(V-v)$ we obtain:

$$\Delta F = \frac{\pm F_0 v}{V-v}$$

Hence, where $v$ is small by comparison to $V$, $\Delta F$ is approximately proportional to $v$, since $F_0$ is constant.

What has been developed mathematically for the condition of a source moving directly toward a microphone receiver can be developed for a source moving within a field defined by three microphone receivers disposed in mutually perpendicular planes. The result is that each microphone receives a frequency which is proportional to the component of velocity of the emitting source with respect to that particular microphone.

The absolute velocity within the field described by the three microphones, with respect to the point at which the three mutually perpendicular planes intersect is obtained by the vector summation of the three individual velocities. That absolute velocity is given by the square root of the sum of the squares of the three individual velocities.

Our system provides a positionally variable point of observation or reference because the three microphones can be moved to various positions so long as these positions meet the requirement that the planes they define are mutually perpendicular. This variability is a valuable adjunct of the system since it makes possible the avoidance of obstacles in the path of emission of the sound wave. Avoidance of obstacles removes the defect of echoes which would otherwise interfere with precise measurement. Usually microphones can be placed in overhead positions with respect to the performance of the operator being measured, simplifying the application of the system in general use.

According to a feature of the invention, the signal of varying frequency received by a microphone is converted into a voltage and is forwarded to an integrator. In this manner the signal, representing a measurement of velocity, is integrated to produce a measure of positional displacement. The three signals produced are passed into three separate integrators to give the three vectors representing the three relative positional displacements. Further, these three vectors are passed into a computer for vector summation with respect to the point of original reference.

According to another feature of the invention, the signal received by a microphone is forwarded to a differentiator. In this manner the signal, representing a measurement of velocity, is differentiated to produce a measure of acceleration. The three signals produced are passed into three separate differentiators to give the three vectors representing the three relative accelerations. Further, these three vectors are passed into a computer for vector summation with respect to the point of original reference.

This invention will now be explained in connection with the description of an embodiment hereinafter described, reference being made to the drawing hereonto attached.

In the drawing there is schematically indicated at 1, a soundwave generator producing a base frequency of 20,000 cycles per second, which is emitted through a speaker or sound emitter 2, attached to a hand whose performance is to be measured. At 3 is shown a fixed reference sound generator producing a reference signal of 21,000 cycles per second.

At 4, 5, and 6 are shown three microphone receivers adapted to receive the sound wave generated at 1 and emitted at 2. The receivers 4, 5, and 6 are disposed in space so that their respective directional axes lie in three mutually perpendicular planes.

The receivers 4, 5, and 6 have associated therewith the frequency comparators 7, 8, and 9, respectively. Frequency comparators 7, 8, and 9 also receive the 21,000 cycles signal from the fixed reference sound generator 3. The outputs of the frequency comparators 7, 8, and 9 are fed to the frequency converters 10, 11, and 12, respectively. The outputs of the frequency converters 10, 11, and 12 are read out in terms of three voltages which are proportional to the components of velocity with which the speaker was moving with respect to the receivers 4, 5, and 6. They are recorded on the recorders 13, 14, and 15, respectively.

Also the outputs of the frequency converters 10, 11, and 12 are fed into the differentiators 16, 17, and 18, respectively. In the differentiators the frequency signals representing velocity components are differentiated to produce outputs which represent acceleration components.

Further the outputs of the frequency converters 10, 11, and 12 are fed into the integrators 19, 20, and 21 respectively. In the said integrators the frequency signals representing velocity components are integrated to produce outputs which represent displacement components or changes in position.

The outputs of the integrators 19, 20, and 21 are read out to the three recorders 22, 23, and 24 respectively to produce a permanent record of the positional changes. This part of the record is useful in giving an accurate statement of the scope of movement, for study in determining wasteful motions.

Similarly the outputs of the differentiators 16, 17, and 18 are read out to the three recorders 25, 26, and 27 respectively, to produce a permanent record of the acceleration components in the three planes.

The outputs of the three differentiators 16, 17, and 18 are fed to a computer 28. In computer 28 the three outputs are summed vectorially. Each output is squared. The three resulting squares are added numerically; next the square root of the sum of the three squares is taken. Computer 28 thus produces a continuous measure of the absolute acceleration with respect to the original point of reference formed by the intersection of the three microphone planes. The output of computer 28 is recorded on recorder 29.

The outputs of the three integrators 19, 20, and 21 are fed to a computer 30. In computer 30 the three outputs are summed vectorially. Each output represents a measure of the appropriate vector of positional displacement. In the computer 30 each output is squared. The three resulting squares are added numerically. Then the square root of the sum of the three squares is taken. Computer 30 thus produces a continuous measure of the absolute positional displacement with reference to the original point of reference. The output of computer 30 is passed to recorder 31.

The outputs of the frequency converters 10, 11, and 12 are likewise summed vectorially in computer 32. In computer 32 they are squared and added. Then the square root of the sum of the three squares is taken. Computer 32 thus produces a continuous measure of the absolute velocity with respect to the original point of reference. The output of computer 32 is recorded on the recorder 33.

In operation it was decided to choose a frequency of sound generation which would offer no obstacle to the worker whose performance was being measured. In consequence 20,000 cycle sound was chosen as the frequency to be emitted by the sound emitter 2. This frequency is just above the upper limits of the audible range.

The selected design velocity range was between 0 and 10 feet per second because it was known that for most industrial applications, repetitions of hand movements above 10 feet per second cannot be performed at all, or cannot be sustained for long periods of time.

Substituting in the equation developed above:

$$\Delta F = \frac{\pm F_0 v}{V - v}$$

For a velocity "$v$" equal to zero, there is of course no Doppler difference and $\Delta F$ equals zero. However, for a velocity "$v$" equal to 10 feet per second, where "$V$" is the velocity of sound, 1080 feet per second, and $F_0$ is 20,000 cycles per second, then the Doppler difference is equal to 186 cycles per second.

The speaker or sound emitter 2 is attached to the body member whose speed is to be measured with the aid of straps and is connected to the sound generator 1 by the customary wires.

The received 20,000 cycle signal output of the generator 1, is subjected to the Doppler effect by movement of the speaker 2 and the result, plus or minus the Doppler change is accepted by the receivers 4, 5, and 6. The received signal is mixed with a 21,000 cycle reference signal, from the reference sound generator, 3. Thus each of the frequency comparators, 7, 8, and 9 obtains a 1,000 cycle signal plus or minus the Doppler change.

Since the Doppler change at 10 feet per second velocity of the speaker 2, is equal to 186 cycles per second, the operating signal ranges between 1186 and 814 cycles per second. It will be noted that for zero relative velocity, the condition in which the speaker is at rest, the operating frequency is 1000 cycles per second. Motions away from the receivers 4, 5, and 6 produce mixed frequency signals less than 1000 cycles per second and whereas motions toward the receivers produce mixed frequency signals greater than 1000 cycles per second.

In the converters 10, 11, and 12 it is necessary to convert each Doppler difference frequency to voltage in a linear fashion, so that the output voltages are directly proportional to velocities. The velocities, as voltages, are recorded on the recorders 13, 14, and 15 respectively.

Each frequency converter output is subjected to the following steps. It is differentiated, recorded, summed up and the summation recorded. The differentiation step provides measurement of the component acceleration. The same output is integrated, recorded, summed up and the summation recorded. The integration step provides measurements of changes in position.

Since many changes could be made in the above construction and many apparently widely different embodiments of this invention could be made without departing from the scope thereof, it is intended that all matter contained in the above description or shown in the accompanying drawing, shall be interpreted as illustrative and not in a limiting sense.

What is claimed is:

1. A system for determining the component of speed of a member of the human body towards or away from a given position comprising a supersonic wave emitter capable of being attached to the body member, means for generating a supersonic wave signal of a fixed frequency connected to said emitter, three receivers located along three mutually perpendicular axes with reference to the given position, a reference wave generator having a fixed frequency, three frequency comparators one connected to each of said three receivers and also to said reference wave generator, a frequency converter connected to each frequency comparator and a recorder connected to each frequency converter to record variations in the frequency output of each comparator as a function of the movement of said supersonic wave emitter with respect to each of said three mutually perpendicular receivers.

2. A system for determining the component of speed of a member of the human body towards or away from a given position comprising a speaker capable of being attached to the body member, means for generating a supersonic wave signal of a fixed frequency connected to said speaker, a reference wave generator producing a fixed frequency signal, three receivers located along three mutually perpendicular axes with reference to the given position to pick up the signal from the speaker, means for beating the signal received by each of said three receivers against the signal of the reference wave generator to obtain three beat signals corresponding to the components of motion of said speaker with respect each of said receivers, means for converting the changes in said three beat signals into corresponding proportional changes in voltage and means for recording said three sets of voltage changes.

3. A system for determining the component of speed of a member of the human body towards or away from a given position comprising a speaker capable of being attached to the body member, means for generating a supersonic wave signal of a fixed frequency connected to said speaker, a reference wave generator producing a fixed frequency signal, three receivers located along three mutually perpendicular axes with reference to the given position to pick up the signal from the moving speaker, three frequency comparators one connected to each of said three receivers and to the reference wave generator for obtaining the three components of the varying beat frequency of the compared signals, a frequency converter connected to each frequency comparator and a recorder to record continuously the variations in the output of each frequency converter as a function of the movement of said supersonic wave signal generating means with respect to each of said three mutually perpendicular receivers.

References Cited in the file of this patent
UNITED STATES PATENTS

| | | |
|---|---|---|
| 2,134,716 | Gunn | Nov. 1, 1938 |
| 2,414,479 | Miller | Jan. 21, 1947 |
| 2,422,064 | Anderson | June 10, 1947 |

OTHER REFERENCES

"Aviation Week," September 15, 1947, pages 28, 30.